United States Patent
Benton et al.

(10) Patent No.: US 11,550,553 B2
(45) Date of Patent: Jan. 10, 2023

(54) USAGE-BASED SOFTWARE LIBRARY DECOMPOSITION

(71) Applicant: Red Hat, Inc., Raleigh, NC (US)

(72) Inventors: William C. Benton, Madison, WI (US); Erik J. Erlandson, Phoenix, AZ (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/101,947

(22) Filed: Nov. 23, 2020

(65) Prior Publication Data
US 2022/0164170 A1    May 26, 2022

(51) Int. Cl.
G06F 9/44     (2018.01)
G06F 8/41     (2018.01)
G06F 8/20     (2018.01)
G06F 8/75     (2018.01)
G06F 8/72     (2018.01)
G06F 8/77     (2018.01)

(52) U.S. Cl.
CPC ............... *G06F 8/433* (2013.01); *G06F 8/24* (2013.01); *G06F 8/443* (2013.01); *G06F 8/72* (2013.01); *G06F 8/75* (2013.01); *G06F 8/77* (2013.01)

(58) Field of Classification Search
CPC ................................ G06F 8/433; G06F 8/443
USPC ........................................................ 717/156
See application file for complete search history.

(56) References Cited

U.S. PATENT DOCUMENTS

| 7,039,923 B2 * | 5/2006 | Kumar | G06F 8/71 |
| | | | 719/331 |
| 7,321,988 B2 * | 1/2008 | Guo | G06F 11/3636 |
| | | | 714/38.11 |
| 8,434,054 B2 * | 4/2013 | Wagner | G06F 8/71 |
| | | | 717/101 |

(Continued)

FOREIGN PATENT DOCUMENTS

CN       111240719 A      6/2020

OTHER PUBLICATIONS

Hejderup, Joseph, et al., "Software Ecosystem Call Graph for Dependency Management," Delft University of Technology, The Netherlands, ICSE-NIER'18 Proceedings of 40th International Conference on Software Engineering, Available online at http://pure.tudelft.nl/ws/portalfiles/portal/38776876/jhejderup_icse18_nier.pdf, May 27-Jun. 3, 2018, 5 pages.

*Primary Examiner* — Francisco J Aponte
(74) *Attorney, Agent, or Firm* — Dority & Manning, P.A.

(57) ABSTRACT

Performing usage-based software library decomposition is disclosed herein. In some examples, a processor device generates a first library graph representing a first software library including multiple functions. The first library graph comprises a plurality of nodes that each correspond to a function of the first software library. The processor device identifies a function within the first software library ("invoked function") that is directly invoked by an application that depends on the first software library, then generates a call graph including nodes within the first library graph ("dependency nodes") corresponding to either the invoked function or another function invoked by the invoked function during application execution. Using the call graph, the processor device generates a second software library including only functions of the first software library corresponding to dependency nodes of the call graph.

20 Claims, 9 Drawing Sheets

(56) References Cited

U.S. PATENT DOCUMENTS

| | | | |
|---|---|---|---|
| 8,910,148 B2* | 12/2014 | Bowyer | G06F 8/61 717/175 |
| 9,122,490 B2* | 9/2015 | Fanning | G06F 8/75 |
| 9,135,591 B1 | 9/2015 | Nicol et al. | |
| 9,348,625 B2* | 5/2016 | Murray | G06F 9/44521 |
| 9,411,557 B1 | 8/2016 | Cartey et al. | |
| 9,678,720 B2* | 6/2017 | Hale | G06F 8/74 |
| 9,785,421 B1 | 10/2017 | Neatherway | |
| 10,073,974 B2 | 9/2018 | Hwang et al. | |
| 10,209,963 B2* | 2/2019 | Hutchison | G06F 3/0673 |
| 10,409,560 B1* | 9/2019 | Bebee | G06F 8/311 |
| 10,409,567 B2* | 9/2019 | St. John | G06F 8/61 |
| 10,423,408 B2* | 9/2019 | Baset | G06F 8/75 |
| 10,552,135 B1* | 2/2020 | Gershnik | G06F 8/62 |
| 10,649,748 B2 | 5/2020 | Bonanno et al. | |
| 11,163,559 B1* | 11/2021 | Samuel | G06F 8/10 |
| 11,392,483 B2* | 7/2022 | DeMonner | G06F 11/3466 |
| 2009/0199171 A1* | 8/2009 | Roe | G06F 11/3612 717/163 |
| 2012/0227061 A1* | 9/2012 | Hunt | G06F 8/71 719/331 |
| 2012/0290560 A1* | 11/2012 | Das | G06F 8/71 707/769 |
| 2013/0145347 A1* | 6/2013 | Karr | G06F 11/3604 717/113 |
| 2014/0026214 A1* | 1/2014 | Adams | G06F 21/54 726/22 |
| 2018/0165080 A1* | 6/2018 | Dimitrov | G06F 8/60 |
| 2019/0065180 A1* | 2/2019 | Spath | G06F 8/75 |
| 2019/0324729 A1* | 10/2019 | Badapanda | G06F 8/36 |
| 2020/0409670 A1* | 12/2020 | Narangodage | G06F 8/30 |
| 2021/0216434 A1* | 7/2021 | Stelmar Netto | G06F 11/079 |
| 2021/0397424 A1* | 12/2021 | Nagao | G06F 8/433 |
| 2022/0206787 A1* | 6/2022 | Samuel | G06F 8/71 |

\* cited by examiner

```
                                    ← 40
             ┌─────────┐
             │  START  │
             └────┬────┘
                  ▼
┌─────────────────────────────────────────────────────────────┐
│ GENERATE, BY A PROCESSOR DEVICE OF A COMPUTING DEVICE, A    │
│ FIRST LIBRARY GRAPH THAT REPRESENTS A FIRST SOFTWARE        │
│ LIBRARY THAT COMPRISES A FIRST PLURALITY OF FUNCTIONS,      │
│ WHEREIN THE FIRST LIBRARY GRAPH COMPRISES A PLURALITY OF    │
│ NODES THAT EACH CORRESPONDS TO A FUNCTION OF THE FIRST      │
│ PLURALITY OF FUNCTIONS                                      │
│                            42                               │
│  ┌───────────────────────────────────────────────────────┐  │
│  │ ANALYZE SOURCE CODE, BYTECODE, OR MACHINE-EXECUTABLE  │  │
│  │         CODE OF THE FIRST SOFTWARE LIBRARY            │  │
│  │                         44                            │  │
│  └───────────────────────────────────────────────────────┘  │
│  ┌───────────────────────────────────────────────────────┐  │
│  │ BASED ON A STATIC CODE ANALYSIS OF THE FIRST          │  │
│  │                 SOFTWARE LIBRARY                      │  │
│  │                         46                            │  │
│  └───────────────────────────────────────────────────────┘  │
│  ┌───────────────────────────────────────────────────────┐  │
│  │ BASED ON A DYNAMICALLY-GENERATED PROGRAM              │  │
│  │ REPRESENTATION OF THE FIRST SOFTWARE LIBRARY THAT     │  │
│  │ COMPRISES A METHOD CALL TRACE OF THE FIRST SOFTWARE   │  │
│  │ LIBRARY OR A BASIC BLOCK TRACE OF THE FIRST SOFTWARE  │  │
│  │                      LIBRARY                          │  │
│  │                         48                            │  │
│  └───────────────────────────────────────────────────────┘  │
└─────────────────────────────┬───────────────────────────────┘
                              ▼
┌─────────────────────────────────────────────────────────────┐
│ IDENTIFY A FUNCTION OF THE FIRST PLURALITY OF FUNCTIONS AS  │
│ AN INVOKED FUNCTION THAT IS DIRECTLY INVOKED BY AN          │
│ APPLICATION THAT DEPENDS ON THE FIRST SOFTWARE LIBRARY      │
│                            50                               │
└─────────────────────────────┬───────────────────────────────┘
                              ▼
                        ┌──────────┐
                        │  TO B IN │
                        │  FIG. 3B │
                        └──────────┘
```

*FIG. 3A*

USAGE-BASED SOFTWARE LIBRARY DECOMPOSITION

BACKGROUND

A "software library," as used herein, is a collection of resources (in particular, one or more functions implemented as pre-written source code, intermediate code such as bytecode, or machine-executable code) organized in such manner as to be usable by multiple other applications. A software developer may rely on a software library to incorporate additional functionality into an application without having to develop such additional functionality themselves. A software library on which an application depends may be distributed in a "package," or archive file, along with the files constituting the application itself.

SUMMARY

The examples disclosed herein relate to performing usage-based software library decomposition. In this regard, in some examples, a processor device of a computing device generates a first library graph to represent a first software library that includes multiple functions. The first library graph comprises multiple nodes, each of which corresponds to one of the functions provided by the first software library. The processor device next identifies a function within the first software library (referred to herein as an "invoked function") that is directly invoked by an application that depends on the first software library. After identifying the invoked function, the processor device generates a call graph based on the first library graph. The call graph includes specific nodes within the first library graph (referred to herein as "dependency nodes") that correspond either to the invoked function, or to another function that is invoked by the invoked function (either directly or indirectly) during execution of the application. Using the call graph, the processor device generates a second software library that includes only the functions of the first software library that correspond to the dependency nodes of the call graph.

In another example, a method is provided. The method comprises generating, by a processor device of a computing device, a first library graph that represents a first software library that comprises a first plurality of functions, wherein the first library graph comprises a plurality of nodes that each corresponds to a function of the first plurality of functions. The method further comprises identifying a function of the first plurality of functions as an invoked function that is directly invoked by an application that depends on the first software library. The method also comprises generating a call graph that comprises a plurality of dependency nodes of the plurality of nodes of the first library graph, wherein each dependency node of the plurality of dependency nodes corresponds to the invoked function or a function invoked by the invoked function during execution of the application. The method additionally comprises generating a second software library based on the call graph, wherein the second software library comprises a second plurality of functions of the first plurality of functions that corresponds to the plurality of dependency nodes.

In another example, a computing device is provided. The computing device comprises a system memory and a processor device coupled to the system memory. The processor device is to generate a first library graph that represents a first software library that comprises a first plurality of functions, wherein the first library graph comprises a plurality of nodes that each corresponds to a function of the first plurality of functions. The processor device is further to identify a function of the first plurality of functions as an invoked function that is directly invoked by an application that depends on the first software library. The processor device is also to generate a call graph that comprises a plurality of dependency nodes of the plurality of nodes of the first library graph, wherein each dependency node of the plurality of dependency nodes corresponds to the invoked function or a function invoked by the invoked function during execution of the application. The processor device is additionally to generate a second software library based on the call graph, wherein the second software library comprises a second plurality of functions of the first plurality of functions that corresponds to the plurality of dependency nodes.

In another example, a computer program product is provided. The computer program product is stored on a non-transitory computer-readable storage medium, and includes computer-executable instructions that, when executed, cause a processor device of a computing device to generate a first library graph that represents a first software library that comprises a first plurality of functions, wherein the first library graph comprises a plurality of nodes that each corresponds to a function of the first plurality of functions. The computer-executable instructions further cause the processor device to identify a function of the first plurality of functions as an invoked function that is directly invoked by an application that depends on the first software library. The computer-executable instructions also cause the processor device to generate a call graph that comprises a plurality of dependency nodes of the plurality of nodes of the first library graph, wherein each dependency node of the plurality of dependency nodes corresponds to the invoked function or a function invoked by the invoked function during execution of the application. The computer-executable instructions additionally cause the processor device to generate a second software library based on the call graph, wherein the second software library comprises a second plurality of functions of the first plurality of functions that corresponds to the plurality of dependency nodes.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 3A-3C are flowcharts illustrating exemplary operations for performing usage-based software library decomposition, according to one example;

DETAILED DESCRIPTION

Figure 1:
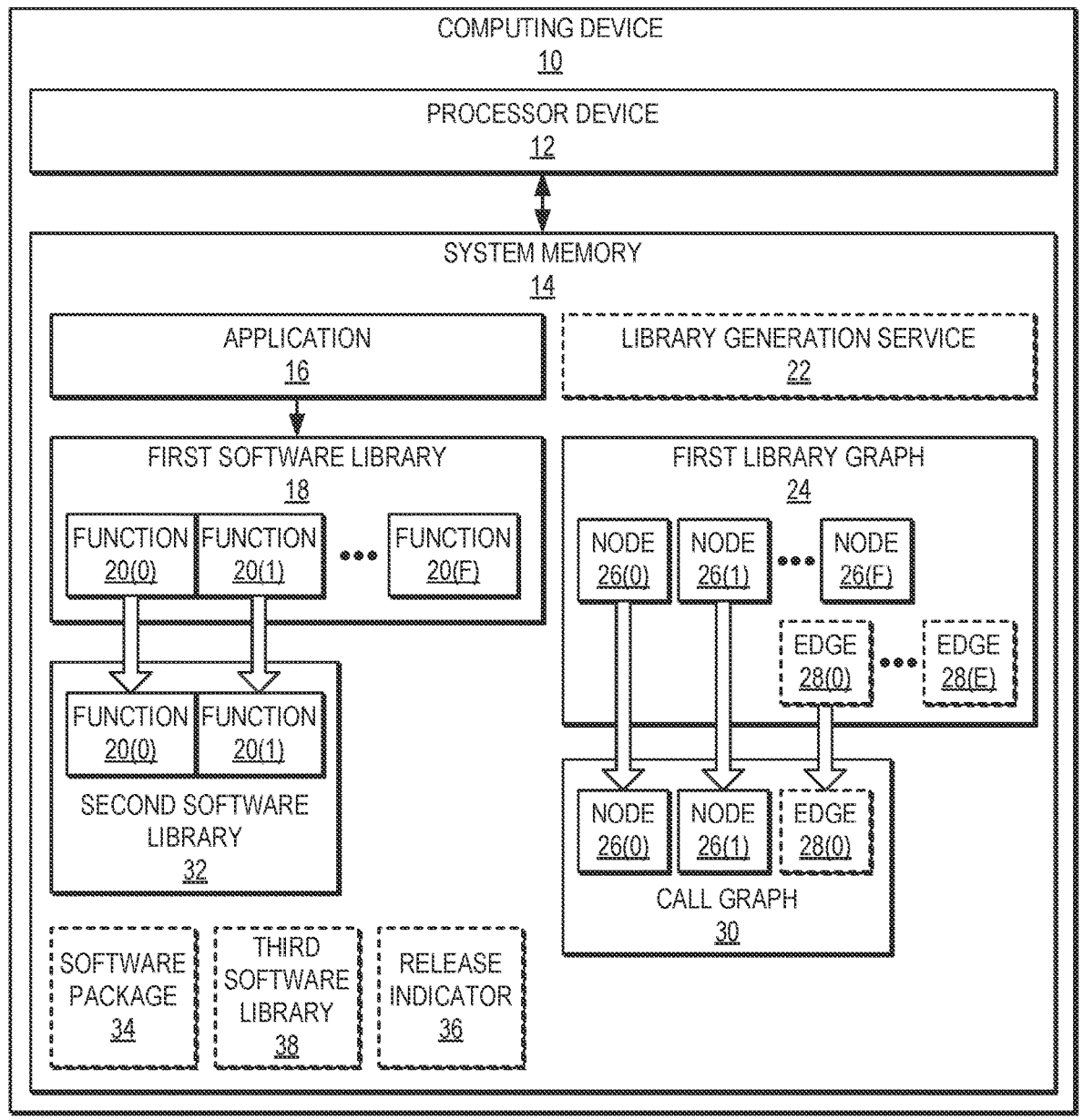
FIG. 1 is a block diagram of a computing device in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As noted above, the term "software library" and derivatives thereof are used herein to refer to collections of resources that are organized in such manner as to be usable by multiple other applications. In particular, a software library may provide one or more functions that are implemented as pre-written source code, intermediate code such as bytecode, or machine-executable code, and that may be accessed by other applications or software libraries. A software developer may rely on a software library to incorporate additional functionality into an application without having to develop such additional functionality themselves. A software library on which an application depends may be distributed in a "package," or archive file, along with the files constituting the application itself.

The application that incorporates a software library may not make use of all the functionality provided by the software library. For example, a software library may provide a large number of functions, of which only a few are actually invoked by the application or by functions that are invoked by the application. Because many software libraries depend in turn on other software libraries, the volume of code on which the application depends may become very large, even if the functionality actually relied upon by the application is relatively modest. Such dependence on ultimately unused code is undesirable for several reasons, including, for instance, larger application distribution sizes, increased consumption of network bandwidth when transferring the application and its associated software libraries, greater risk of compatibility issues between software libraries, increased difficulty in debugging, and potential exposure to security exploits in otherwise unused code. Containerized applications operating in cloud environments may be especially susceptible to application bloat and security vulnerabilities introduced by software library dependencies.

Accordingly, examples disclosed herein relate to performing usage-based software library decomposition. The term "software library decomposition" and derivatives thereof are used herein to refer to processes for analyzing a software library to specifically identify any functions provided therein that are actually required for a particular application to operate correctly. Once these functions are identified, a reduced-size software library that includes only the identified function or functions may be generated and distributed with the application (i.e., in place of the original software library). The operations for usage-based software library decomposition disclosed herein may be performed, e.g., while compiling or building the application.

In this regard, in some embodiments, a processor device of a computing device generates a first library graph to represent a first software library that includes multiple functions. The first library graph comprises multiple nodes, each of which corresponds to one of the functions provided by the first software library. In some examples, the first library graph may be generated based on an analysis of source code, bytecode, or machine-executable code of the first software library. Some examples may provide that the first library graph is generated based on a static code analysis of the first software library, or on a dynamically-generated program representation (e.g., a method call trace or a basic block trace) of the first software library.

The processor device next identifies a function within the first software library (referred to herein as an "invoked function") that is directly invoked by an application that depends on the first software library. According to some examples, the invoked function may be exposed to the application via an application programming interface (API) of the software library, and may be represented as an entry node within the first library graph. After identifying the invoked function, the processor device generates a call graph based on the first library graph. The call graph includes specific nodes within the first library graph (referred to herein as "dependency nodes") that correspond either to the invoked function, or to another function that is invoked by the invoked function (either directly or indirectly) during execution of the application. The call graph in some embodiments may be generated based on runtime profiling of the application and/or the first software library.

Using the call graph, the processor device then generates a second software library that includes only the functions of the first software library that correspond to the dependency nodes of the call graph. The second software library thus represents the end result of usage-based decomposition of the first software library, in that the second software library contains just the functions of the first software library that are actually used by the application. In some examples, a software package that includes the application and the second software library may be generated for distribution.

Some examples may provide that the first library graph and the call graph may be stored by the processor device for later use. For instance, the first library graph may be stored in association with a release indicator for the first software library. If an updated version of the first software library (i.e., a third software library) is later developed, the third software library may be compared with the first software library to identify any functions of the first software library that are modified in the third software library. The identified functions can then be compared with the call graph to determine whether the application requires the third software library, or whether the application can continue to use the first software library without adverse effects. As a non-limiting example, if a comparison of the first software library and the third software library indicates that only functions A and B of the first software library were modified in the third software library, but the call graph indicates that functions A and B in the first software library are not utilized by the application, then the application can continue to use the first software library without adverse effects. Other uses of the first library graph and the call graph are discussed below in greater detail with respect to FIG. 1.

It is to be understood that the operations described above for performing usage-based software library decomposition may be performed for multiple invoked functions within a single software library, and/or for multiple software libraries on which a single application depends. Additionally, while the operations for generating the first library graph and the call graph are described herein based on analysis of the first software library at the function level, some examples may perform analogous operations at other granularities, such as the module level or basic block level. The operations may be performed by a specialized library generation service executed by the processor device, or may be performed in whole or in part by, e.g., a package manager, a linker, and/or a compiler executed by the processor device.

To illustrate a computing device on which examples may be practiced, FIG. 1 is provided. In FIG. 1, a computing device 10 includes a processor device 12 communicatively coupled to a system memory 14. The computing device 10 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some embodiments of the computing device 10 may include more or fewer elements than illustrated in FIG. 1. For example, the processor device 12 may further include one or more functional units, instruction caches, unified caches, memory controllers, interconnect buses, and/or additional memory devices, caches, and/or controller circuits, which are omitted from FIG. 1 for the sake of clarity.

The processor device 12 executes an application 16 that depends on a first software library 18. The application 16 may comprise any software program or framework able to be executed by the processor device 12. The first software library 18 comprises a plurality of functions 20(0)-20(F), each of which is a subprogram or subroutine that encapsulates some specific functionality, and at least one of which is directly invoked by the application 16. The term "directly invoked" and derivatives thereof are used herein to mean that the application 16 initiates execution of at least one of the functions 20(0)-20(F) by calling the function using a name or a unique identifier for the function. The first software library 18 may comprise source code, intermediate-level code such as bytecode, or machine-executable code, as non-limiting examples. Although not shown in FIG. 1, the first software library 18 may further include other resources for use by the application 16, such as image files, icon files, text files, and the like, as non-limiting examples.

As noted above, while the application 16 requires the first software library 18 to execute properly, the application 16 may not make use of all of the functions 20(0)-20(F) within the first software library 18. Thus, it may be desirable to generate a reduced-size version of the first software library 18 that includes only the functions among the functions 20(0)-20(F) that are directly invoked by the application 16, or that are invoked by a function that is directly invoked by the application 16 during execution of the application 16.

Accordingly, in the example of FIG. 1, the processor device 12 executes a library generation service 22 to perform usage-based software library decomposition. It is to be understood that, while the library generation service 22 is illustrated as a standalone process in FIG. 1, the functionality of the library generation service 22 may be incorporated into or distributed among other applications or processes executed by the processor device 12, such as a package manager, a linker, or a compiler, as non-limiting examples. In exemplary operation, the library generation service 22 generates a first library graph 24 that represents the first software library 18. The first library graph 24 comprises a plurality of nodes 26(0)-26(F), each of which corresponds to a function of the plurality of functions 20(0)-20(F) of the first software library 18. Thus, in the example of FIG. 1, the node 26(0) corresponds to the function 20(0), the node 26(1) corresponds to the function 20(1), and so on. Additionally, the first library graph 24 of FIG. 1 also comprises one or more edges 28(0)-28(E) that each connect two of the nodes 26(0)-26(F), and that indicate an inter-function dependency between two corresponding functions of the functions 20(0)-20(F). As used herein, an "inter-function dependency" is said to exist between two functions when one of the two functions invokes the other of the two functions. The arrangement of nodes and edges in library graphs such as the first library graph 24 is illustrated and discussed in greater detail below with respect to FIGS. 2A and 2B.

In some examples, the library generation service 22 may generate the first library graph 24 by performing an analysis of the source code, bytecode, or machine-executable code of the first software library 18. Some examples may provide that the library generation service 22 generates the first library graph 24 based on a static code analysis of the first software library 18, or based on a dynamically-generated program representation of the first software library (e.g., a method call trace or a basic block trace, as non-limiting examples).

The library generation service 22 in FIG. 1 next identifies a function of the plurality of functions 20(0)-20(F) as an invoked function (i.e., a function that is directly invoked by the application 16). The library generation service 22 then generates a call graph 30 that includes a plurality of dependency nodes, or nodes of the plurality of nodes 26(0)-26(F) of the first library graph 24 that correspond to either an invoked function of the functions 20(0)-20(F), or a function of the functions 20(0)-20(F) that is invoked by the invoked function (directly or indirectly) during execution of the application 16. In the example of FIG. 1, it is assumed that the function 20(0) is an invoked function, and the function 20(1) is invoked by the invoked function 20(0) during execution of the application 16. Thus, the call graph 30 of FIG. 1 includes dependency nodes 26(0) and 26(1), along with the edge 28(0) that connects the dependency nodes 26(0) and 26(1) in the first library graph 24 to indicate the inter-function dependency between the function 20(0) and the function 20(1). The call graph 30 in some embodiments may be generated based on runtime profiling of the application 16 and/or the first software library 18.

Finally, the library generation service 22 generates a second software library 32 that includes the functions 20(0) and 20(1) corresponding to the dependency nodes 26(0) and 26(1). Because the second software library 32 includes only the functions of the first software library 18 that are required for the application 16 to execute, the second software library 32 can be stored using less storage space, requires less network bandwidth to transfer, and presents lower risks of compatibility issues and exposure to security exploits. In some examples, the library generation service 22 may generate a software package 34 comprising the application 16 and the second software library 32 for subsequent distribution.

According to some examples, the library generation service 22 may store the first library graph 24 and the call graph 30 (e.g., using a persistent storage medium of the computing device) for later use. In some examples, the library generation service 22 may store the first library graph 24 in association with a release indicator 36 that indicates, e.g., a version number or other release information for the first software library 18. The first library graph 24 may subsequently be used by the library generation service 22 to more efficiently perform usage-based software library decomposition for the first software library 18 with respect to other applications besides the application 16.

In some examples, the library generation service 22 may also store the call graph 30 in association with the application 16 and the release indicator 36 for the first software library 18. If a third software library 38 comprising an updated version of the first software library 18 is later developed, the library generation service 22 in such examples may compare the third software library 38 with the first software library 18 to identify one or more functions of the plurality of functions 20(0)-20(F) of the first software library 18 that are modified in the third software library 38. The library generation service 22 may then compare the identified functions with the call graph 30 to determine whether the application 16 requires the third software library 38, or whether the application 16 can continue to use the first software library 18 without adverse effects.

The operations described above, and the first library graph 24 and the call graph 30 generated as a result of said operations, may be also useful in a number of other scenarios. For example, the first library graph 24 and/or the call graph 30 may be employed to assist with understanding software issues, such as enabling software developers to identify a sequence of commits of edited code to a code base that may have introduced a bug or other error. The first library graph 24 and/or the call graph 30 may also be applied to problems relating to automated software quality management. In some examples, for instance, continuous integration (CI) practices may be predicated on not increasing the "dependency surface" of an application (i.e., the parts of a software library that an application directly interacts with). The data structures generated by the operations described above may be used to assess the dependency surface of an application such as the application 16, and to determine changes to the dependency surface in subsequent releases of the application 16.

The first library graph 24 and/or the call graph 30 may additionally be used in addressing problems related to automated software auditing (e.g., ensuring that optional functionality in a software library that has undesirable licensing terms, that is illegal to ship in certain jurisdictions, or that is encumbered by intellectual property restrictions is not dependent on or shipped with an application that links to that software library). Moreover, the first library graph 24 and/or the call graph 30 may be used to suggest static decompositions of software libraries based on properties of the first library graph 24 and/or the call graph 30. For instance, if the first library graph 24 can be cleanly partitioned into a number N disjoint subgraphs, it may make sense to decompose the first software library into N different software libraries. Such decompositions may also be used identify code that is a good candidate for removal from the software library. Some examples may make use of machine learning (ML) and optimization techniques to suggest static decompositions of software libraries based on properties of the first library graph 24 and based on a population of client applications, or to suggest software library refactorings that would enable finer-grained software library decompositions.

Figure 2A:
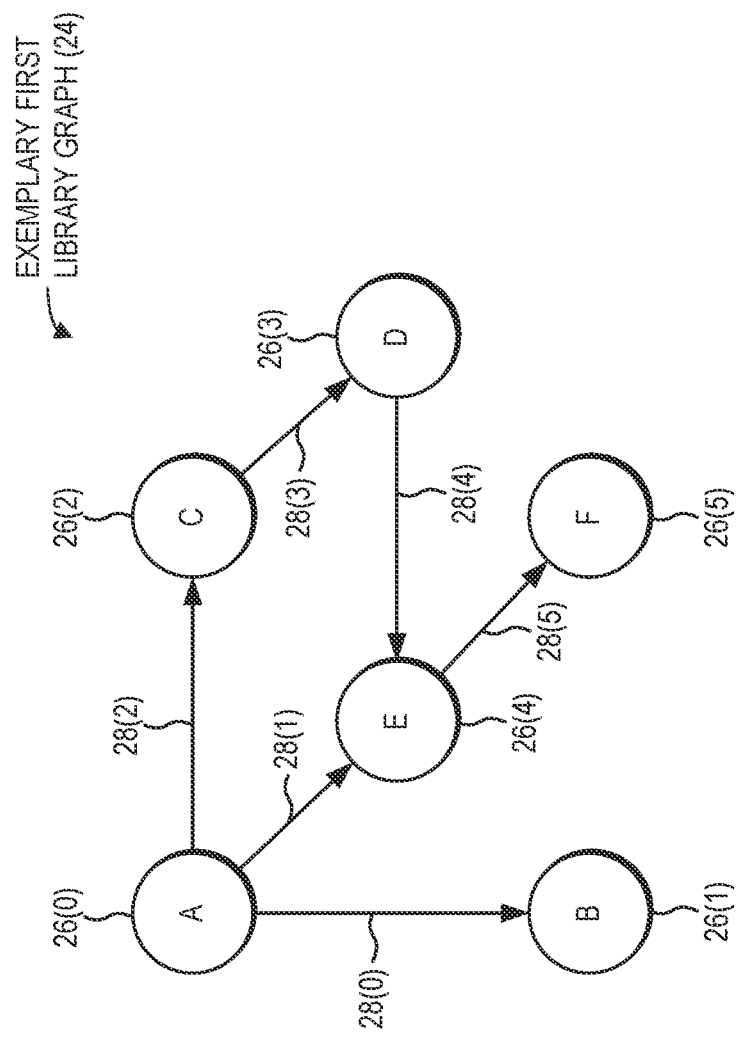
FIGS. 2A and 2B are diagrams illustrating an exemplary library graph and an exemplary call graph, respectively, for performing usage-based software library decomposition, according to one example.
Figure 2B:
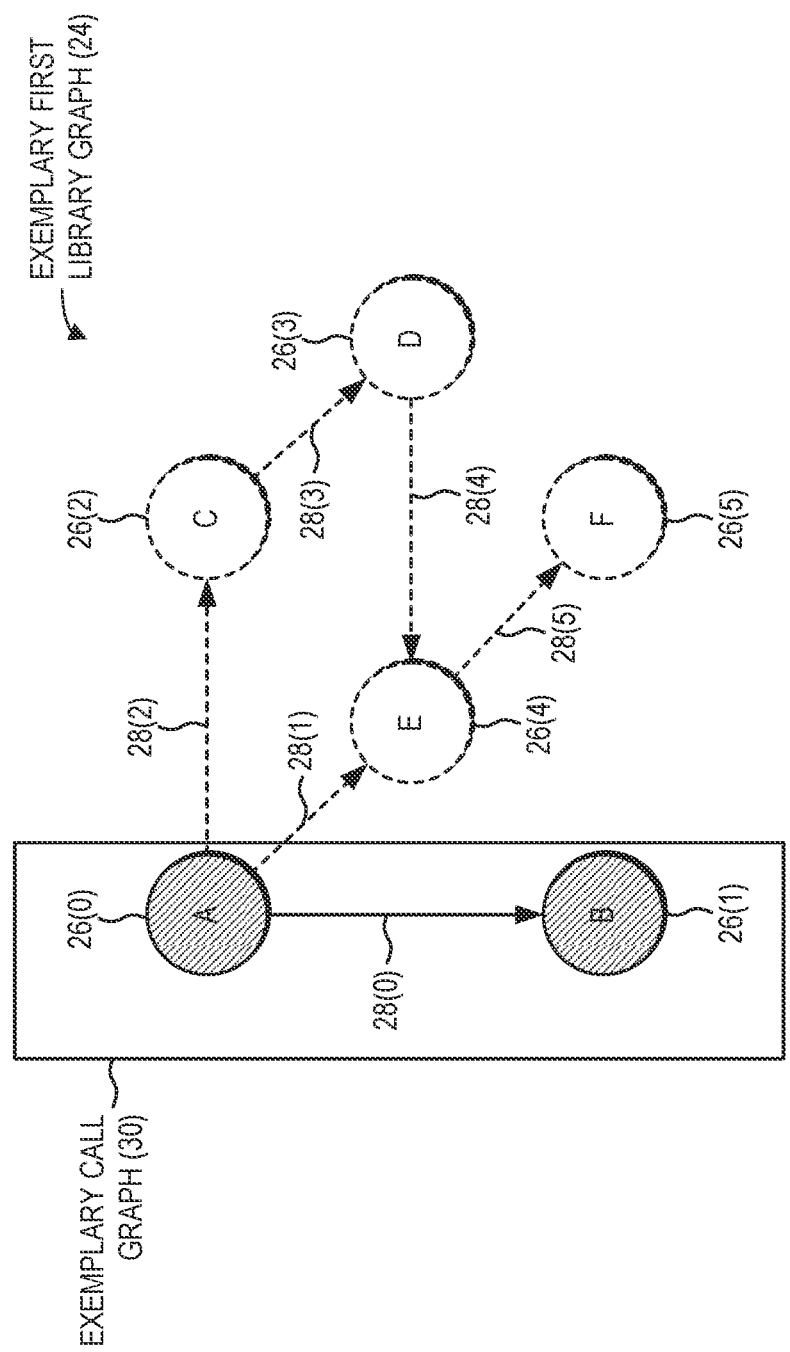

FIGS. 2A and 2B provide illustrations of the first library graph 24 and the call graph 30 of FIG. 1, respectively, according to one example. In the example of FIG. 2A, the first library graph 24 includes a total of six nodes 26(0)-26(5) (i.e., nodes 26(0)-26(F) of FIG. 1, where F=5). The nodes 26(0)-26(5) correspond to the functions 20(0)-20(5) (referred to in FIGS. 2A and 2B as functions A, B, C, D, E, and F, respectively) of the first software library 18 of FIG. 1. Additionally, the first library graph 24 of FIGS. 2A and 2B includes the edges 28(0)-28(5) (i.e., edges 28(0)-28(E) of FIG. 1, where E=6), each of which connects two of the nodes 26(0)-26(5) to indicate an inter-function dependency between the corresponding functions 20(0)-20(5). Thus, in the example of FIG. 2A, function A invokes (and thus has an inter-function dependency on) function B, function E, and function C. Accordingly, the node 26(0) corresponding to function A is connected to the node 26(1) by the edge 28(0), the node 26(4) by the edge 28(1), and the node 26(2) by the edge 28(2). Similarly, function C invokes function D, which invokes function E, which invokes function F. As a result, the node 26(2) is connected to the node 26(3) by the edge 28(3), the node 26(4) is connected to the node 26(4) by the edge 28(4), and the node 26(4) is connected to the node 26(5) by the edge 28(5).

Referring now to FIG. 2B, it is assumed in this example that function A is the only function that is directly invoked by the application 16, and further that, while function A depends on function B, function E, and function C, only function B is actually invoked during execution of the application 16. Thus, nodes 26(0) and 26(1), corresponding to function A (i.e., function 20(0) of FIG. 1) and function B (i.e., function 20(1) of FIG. 1), respectively, are identified as dependency nodes 26(0) and 26(1). The dependency nodes 26(0) and 26(1), along with the connecting edge 28(0), make up the call graph 30 of FIG. 1.

It is to be understood that the number of the nodes, the number of edges, the correspondence between nodes and functions, and the inter-function dependencies between functions shown in FIGS. 2A and 2B for the first library graph 24 and the call graph 30 are for illustrative purposes only, and may vary in other examples disclosed herein.

Figure 3B:
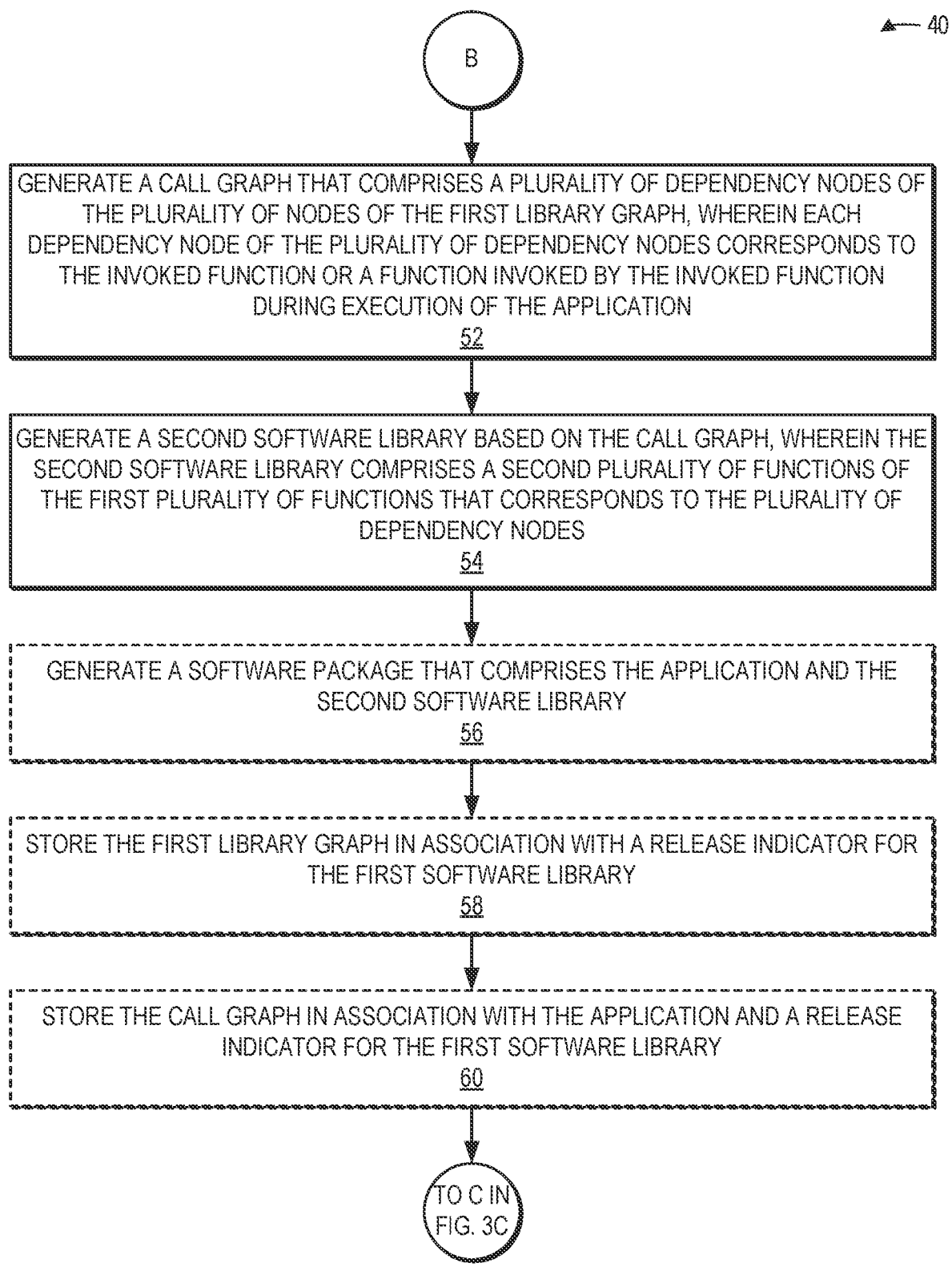
Figure 3C:
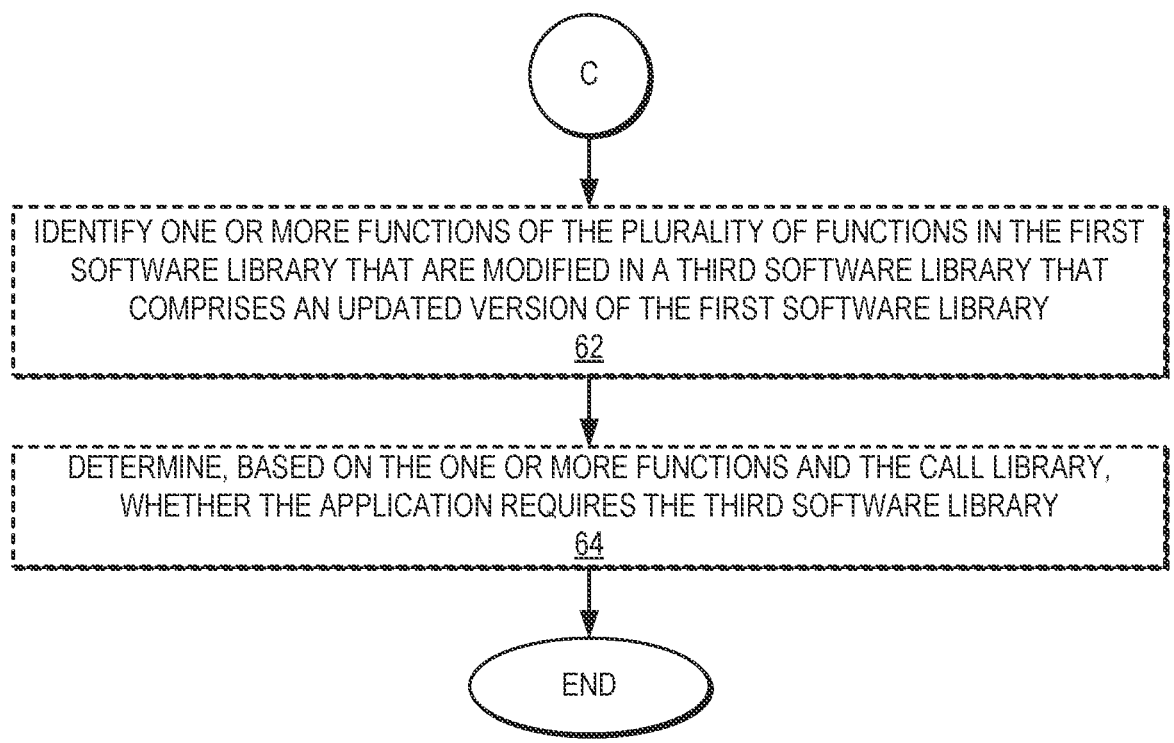

To illustrate exemplary operations for performing usage-based software library decomposition according to one example, FIGS. 3A-3C provide a flowchart 40. For the sake of clarity, elements of FIGS. 1 and 2 are referenced in describing FIGS. 3A-3C. In FIG. 3A, operations begin with the processor device 12 generating the first library graph 24 that represents the first software library 18 that comprises the first plurality of functions 20(0)-20(F), wherein the first library graph 24 comprises the plurality of nodes 26(0)-26(F) that each corresponds to a function of the first plurality of functions 20(0)-20(F) (block 42). In some examples, the operations of block 42 for generating the first library graph 24 may include analyzing source code, bytecode, or machine-executable code of the first software library 18 (block 44). Some examples may provide that the operations of block 42 for generating the first library graph 24 are based on a static code analysis of the first software library 18 (block 46). According to some examples, the operations of block 42 for generating the first library graph 24 are based on a dynamically-generated program representation of the first software library 18 that comprises a method call trace of the first software library 18 or a basic block trace of the first software library 18 (block 48). The processor device 12 next identifies a function of the first plurality of functions 20(0)-20(F) as the invoked function 20(0) that is directly invoked by the application 16 that depends on the first software library 18 (block 50). Operations then continue at block 52 of FIG. 3B.

Referring now to FIG. 3B, the processor device 12 generates the call graph 30 that comprises the plurality of dependency nodes 26(0), 26(1) of the plurality of nodes 26(0)-26(F) of the first library graph 24, wherein each dependency node of the plurality of dependency nodes 26(0), 26(1) corresponds to the invoked function 20(0) or a function invoked by the invoked function 20(0) during execution of the application 16 (block 52). The processor device 12 then generates the second software library 32 based on the call graph 30, wherein the second software library 32 comprises the second plurality of functions 20(0), 20(1) of the first plurality of functions 20(0)-20(F) that corresponds to the plurality of dependency nodes 26(0), 26(1) (block 54).

In some examples, the processor device 12 may generate the software package \am\ that comprises the application 16 and the second software library 32 (block 56). Some examples may provide that the processor device 12 stores the first library graph 24 in association with the release indicator 36 for the first software library 18 (block 58). According to some examples, the processor device 12 may store the call graph 30 in association with the application 16 and the release indicator 36 for the first software library 18 (block 60). Operations then continue at block 62 of FIG. 3C.

Turning now to FIG. 3C, the processor device 12 in some examples may identify one or more functions of the plurality of functions 20(0)-20(F) in the first software library 18 that are modified in a third software library 38 that comprises an updated version of the first software library 18 (block 62). The processor device 12 in such examples may determine, based on the one or more functions and the call graph 30, whether the application 16 requires the third software library 38 (block 64).

Figure 4:
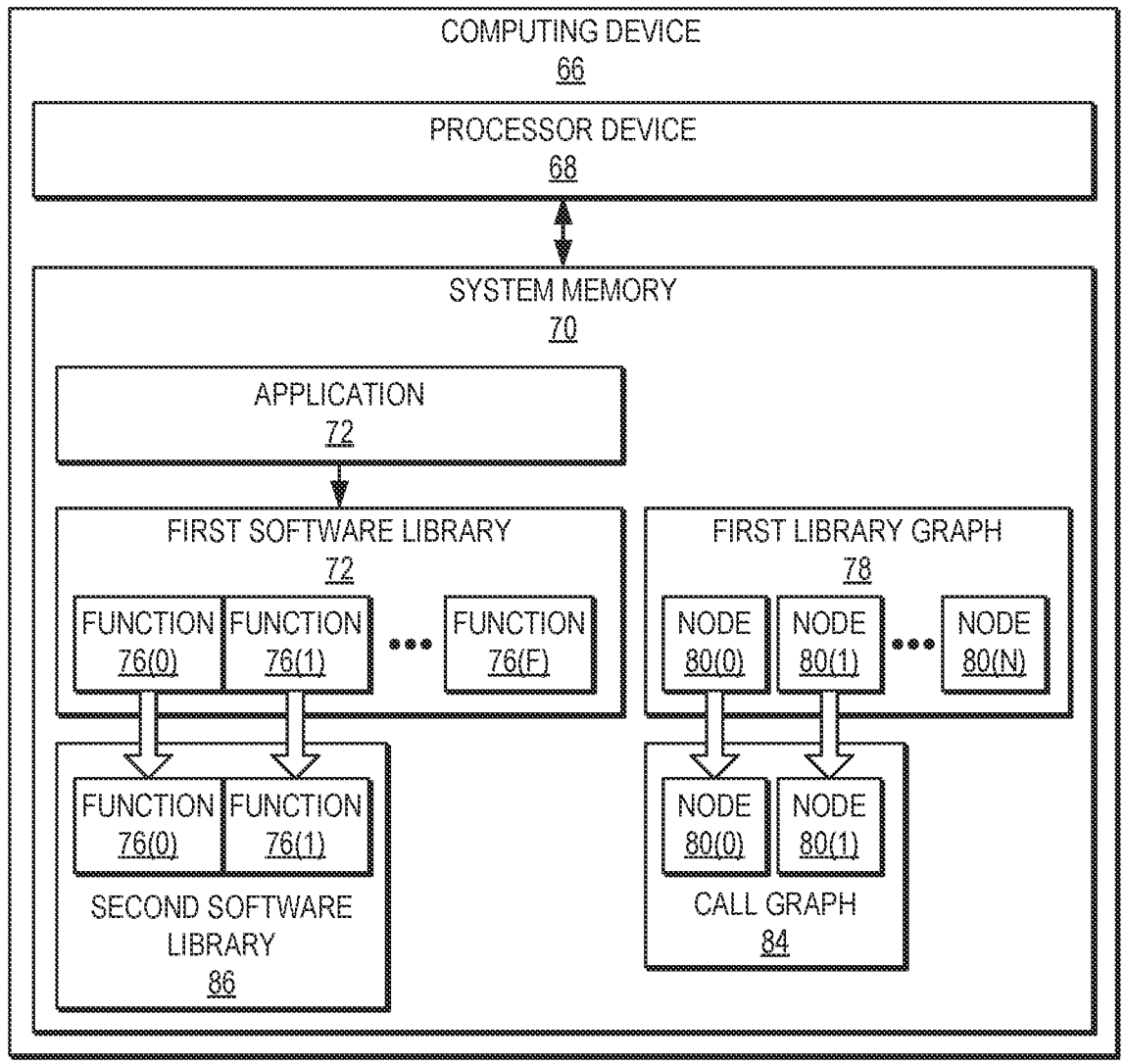
FIG. 4 is a simpler block diagram of the computing device of FIG. 1 for performing usage-based software library decomposition, according to one example.

FIG. 4 is a simpler block diagram of the computing device 10 of FIG. 1 for performing usage-based software library decomposition, according to one example. In FIG. 4, a computing device 66 includes a processor device 68 communicatively coupled to a system memory 70. The processor device 68 executes an application 72 that depends on a first software library 74 that comprises a plurality of functions 76(0)-76(F), each of which is a subprogram or subroutine that encapsulates some specific functionality, and at least one of which is directly invoked by the application 72.

The processor device 68 generates a first library graph 78 that represents the first software library 74. The first library graph 78 comprises a plurality of nodes 80(0)-80(F), each of which corresponds to a function of the plurality of functions 76(0)-76(F) of the first software library 74. Thus, in the example of FIG. 1, the node 80(0) corresponds to the function 76(0), the node 80(1) corresponds to the function 76(1), and so on.

The processor device 68 next identifies a function of the plurality of functions 76(0)-76(F) as an invoked function (i.e., a function that is directly invoked by the application 72). The processor device 68 then generates a call graph 84 that includes a plurality of dependency nodes, or nodes of the plurality of nodes 80(0)-80(F) of the first library graph 78 that correspond to either an invoked function of the functions 76(0)-76(F), or a function of the functions 76(0)-76(F) that is invoked by the invoked function (directly or indirectly) during execution of the application 72. In the example of FIG. 4, it is assumed that the function 76(0) is an invoked function, and the function 76(1) is invoked by the invoked function 76(0) during execution of the application 72. Thus, the call graph 84 of FIG. 4 includes dependency nodes 80(0) and 80(1), along with the edge 82(0) that connects the dependency nodes 80(0) and 80(1) in the first library graph 78 to indicate the inter-function dependency between the function 76(0) and the function 76(1).

Finally, the processor device 68 generates a second software library 86 that includes the functions 76(0) and 76(1) corresponding to the dependency nodes 80(0) and 80(1). Because the second software library 86 includes only the functions of the first software library 74 that are required for the application 72 to execute, the second software library 86 can be stored using less storage space, requires less network bandwidth to transfer, and presents lower risks of compatibility issues and exposure to security exploits.

Figure 5:
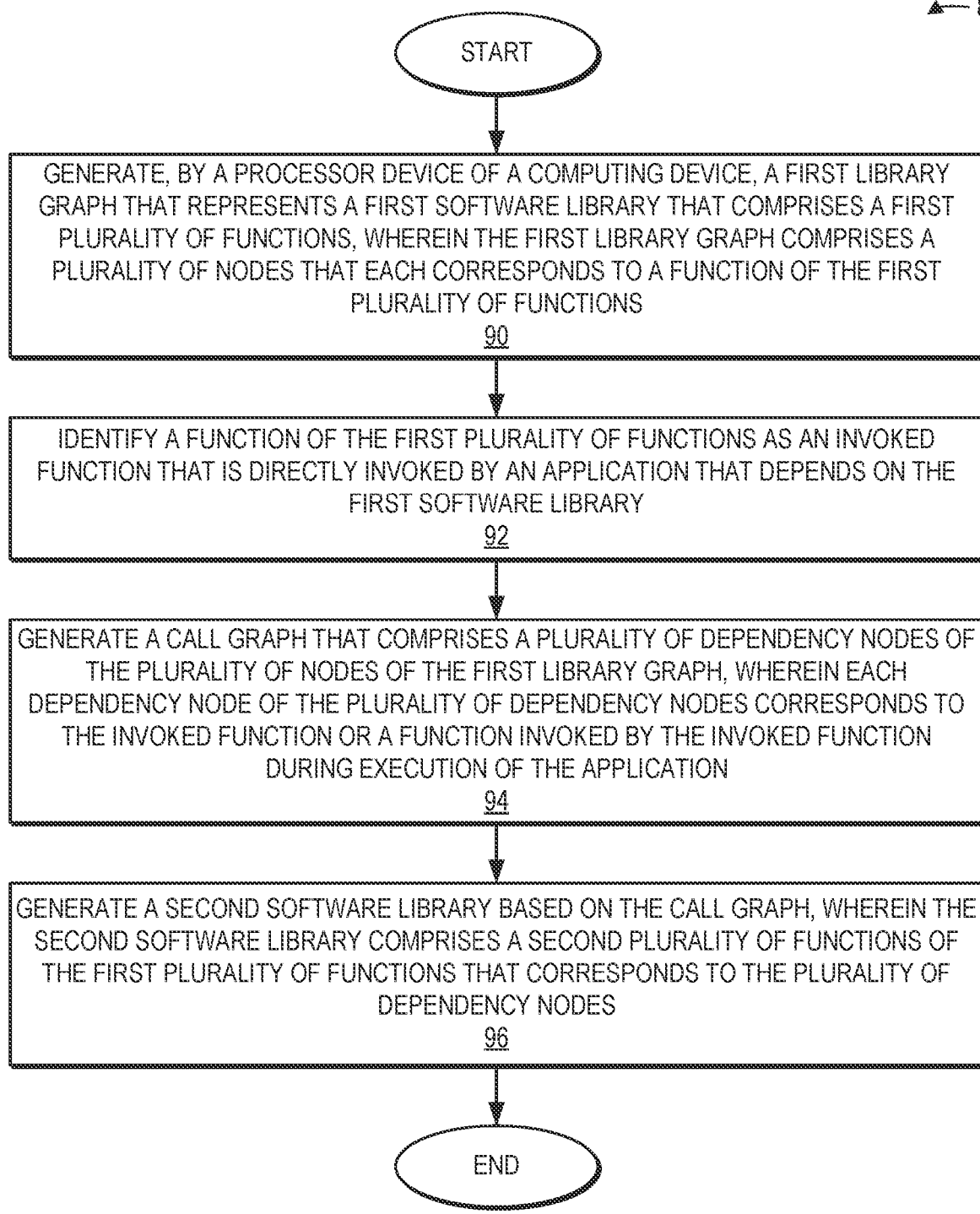
FIG. 5 is a flowchart of a simplified method for performing usage-based software library decomposition on the computing device of FIG. 4, according to one example.

FIG. 5 provides a flowchart 88 illustrating a simplified method for performing usage-based software library decomposition using the computing device 66 of FIG. 4, according to one example. Elements of FIG. 4 are referenced in describing FIG. 5 for the sake of clarity. Operations in FIG. 5 begin with the processor device 68 generating the first library graph 78 that represents the first software library 74 that comprises the first plurality of functions 76(0)-76(F), wherein the first library graph 78 comprises the plurality of nodes 80(0)-80(N) that each corresponds to a function of the first plurality of functions 76(0)-76(F) (block 90). The processor device 68 identifies a function of the first plurality of functions 76(0)-76(F) as an invoked function 76(0) that is directly invoked by the application 72 that depends on the first software library 74 (block 92).

The processor device 68 next generates the call graph 84 that comprises the plurality of dependency nodes 80(0), 80(1) of the plurality of nodes 80(0)-80(N) of the first library graph 78, wherein each dependency node of the plurality of dependency nodes 80(0), 80(1) corresponds to the invoked function 76(0) or a function 76(1) invoked by the invoked function 76(0) during execution of the application 72 (block 94). Finally, the processor device 68 generates the second software library 86 based on the call graph 84, wherein the second software library 86 comprises the second plurality of functions 76(0), 76(1) of the first plurality of functions 76(0)-76(F) that corresponds to the plurality of dependency nodes 80(0), 80(1) (block 96).

Figure 6:
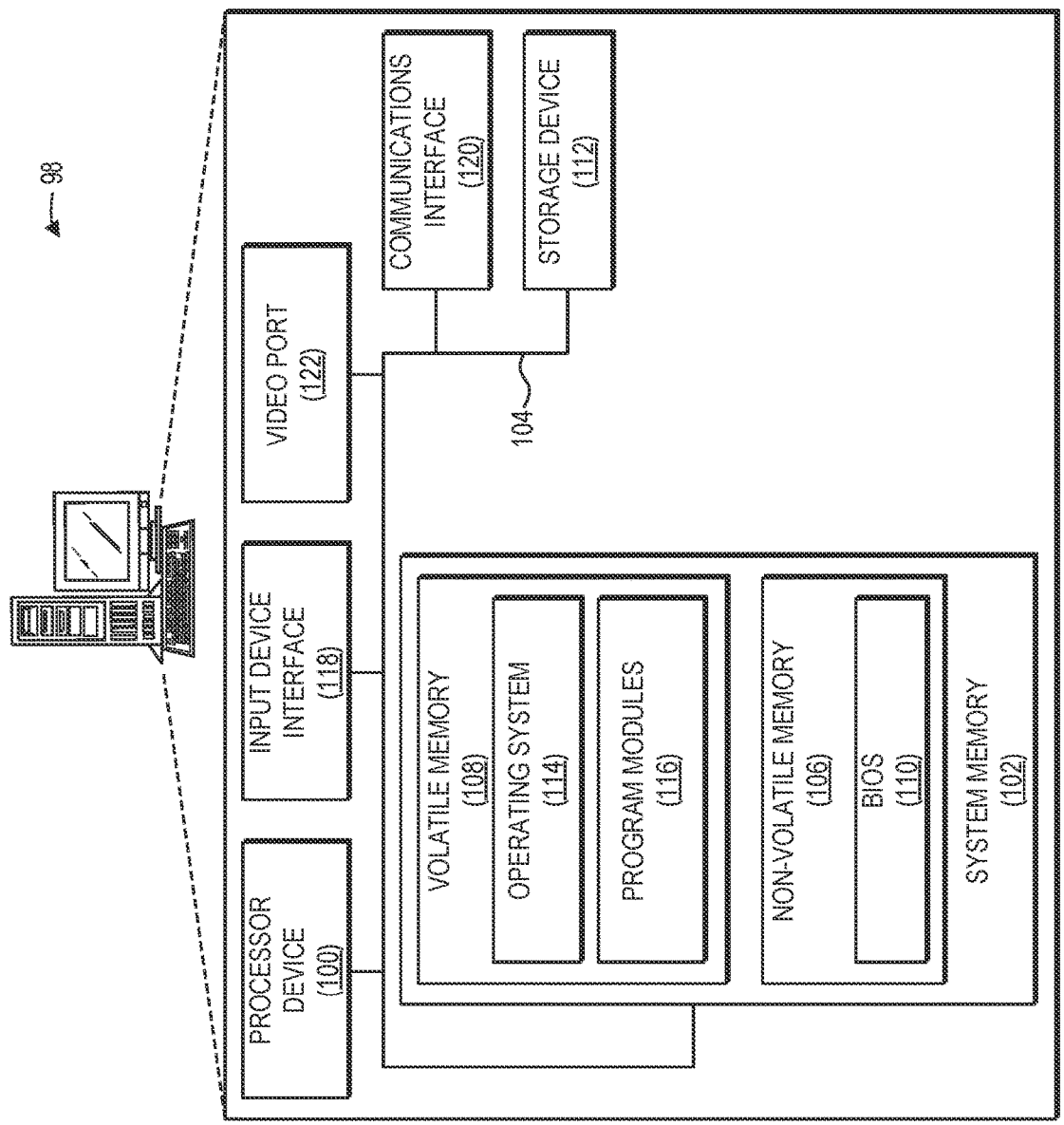
FIG. 6 is a block diagram of a computing device suitable for implementing examples, according to one example.

FIG. 6 is a block diagram of a computing device 98, such as the computing device 10 of FIG. 1 or the computing device 66 of FIG. 4, suitable for implementing examples according to one example. The computing device 98 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 98 includes a processor device 100, a system memory 102, and a system bus 104. The system bus 104 provides an interface for system components including, but not limited to, the system memory 102 and the processor device 100. The processor device 100 can be any commercially available or proprietary processor.

The system bus 104 may be any of several types of bus structures that may further interconnect to a memory bus (with or without a memory controller), a peripheral bus, and/or a local bus using any of a variety of commercially available bus architectures. The system memory 102 may include non-volatile memory 106 (e.g., read-only memory (ROM), erasable programmable ROM (EPROM), electrically EPROM (EEPROM), etc.), and volatile memory 108 (e.g., random access memory (RAM)). A basic input/output system (BIOS) 110 may be stored in the non-volatile memory 106 and can include the basic routines that help to transfer information among elements within the computing device 98. The volatile memory 108 may also include a high-speed RAM, such as static RAM, for caching data.

The computing device 98 may further include or be coupled to a non-transitory computer-readable storage medium such as a storage device 112, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 112 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 112 and in the volatile memory 108, including an operating system 114 and one or more program modules 116 which may implement the functionality described herein in whole or in part. It is to be appreciated that the examples can be implemented with various commercially available operating systems 114 or combinations of operating systems 114. All or a portion of the examples may be implemented as a computer program product stored on a transitory or non-transitory computer-usable or computer-readable storage medium, such as the storage device 112, which includes complex programming instructions, such as complex computer-readable program code, to cause the processor device 100 to carry out the steps described herein. Thus, the computer-readable program code can comprise software instructions for implementing the functionality of the examples described herein when executed on the processor device 100. The processor device 100 may serve as a controller, or control system, for the computing device 98 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 100 through an input device interface 118 that is coupled to the system bus 104 but can be connected by other interfaces, such as a parallel port, an Institute of Electrical and Electronic Engineers (IEEE) 13100 serial port, a Universal Serial Bus (USB) port, an infrared (IR) interface, and the like.

The computing device 98 may also include a communications interface 120 suitable for communicating with a network as appropriate or desired. The computing device 98 may also include a video port 122 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
generating, by a processor device of a computing device, a first library graph that represents a first software library that comprises a first plurality of functions, wherein the first library graph comprises a plurality of nodes that each corresponds to a function of the first plurality of functions;
identifying a function of the first plurality of functions as an invoked function that is directly invoked by an application that depends on the first software library;
generating a call graph that comprises a plurality of dependency nodes of the plurality of nodes of the first library graph, wherein each dependency node of the plurality of dependency nodes corresponds to the invoked function or a function invoked by the invoked function during execution of the application; and
generating a second software library based on the call graph by copying a second plurality of functions of the first plurality of functions that corresponds to the plurality of dependency nodes from the first software library to the second software library.

2. The method of claim 1, further comprising generating a software package that comprises the application and the second software library.

3. The method of claim 1, wherein generating the first library graph comprises analyzing source code, bytecode, or machine-executable code of the first software library.

4. The method of claim 1, wherein generating the first library graph is based on a static code analysis of the first software library.

5. The method of claim 1, wherein generating the first library graph is based on a dynamically-generated program representation of the first software library that comprises a method call trace of the first software library or a basic block trace of the first software library.

6. The method of claim 1, further comprising storing the first library graph in association with a release indicator for the first software library.

7. The method of claim 1, further comprising storing the call graph in association with the application and a release indicator for the first software library.

8. The method of claim 7, further comprising:
identifying one or more functions of the plurality of functions in the first software library that are modified in a third software library that comprises an updated version of the first software library; and
determining, based on the one or more functions and the call graph, whether the application requires the third software library.

9. A computing device, comprising:
a system memory; and
a processor device coupled to the system memory to:
generate a first library graph that represents a first software library that comprises a first plurality of functions, wherein the first library graph comprises a plurality of nodes that each corresponds to a function of the first plurality of functions;
identify a function of the first plurality of functions as an invoked function that is directly invoked by an application that depends on the first software library;
generate a call graph that comprises a plurality of dependency nodes of the plurality of nodes of the first library graph, wherein each dependency node of the plurality of dependency nodes corresponds to the invoked function or a function invoked by the invoked function during execution of the application; and generate a second software library based on the call graph by copying a second plurality of functions of the first plurality of functions that corresponds to the plurality of dependency nodes from the first software library to the second software library.

10. The computing device of claim 9, wherein the processor device is further to generate a software package that comprises the application and the second software library.

11. The computing device of claim 9, wherein to generate the first library graph is to analyze source code, bytecode, or machine-executable code of the first software library.

12. The computing device of claim 9, wherein the processor device is to generate the first library graph based on a static code analysis of the first software library.

13. The computing device of claim 9, wherein the processor device is to generate the first library graph based on a dynamically-generated program representation of the first software library that comprises a computing device call trace of the first software library or a basic block trace of the first software library.

14. The computing device of claim 9, wherein the processor device is further to store the first library graph in association with a release indicator for the first software library.

15. The computing device of claim 9, wherein the processor device is further to store the call graph in association with the application and a release indicator for the first software library.

16. The computing device of claim 15, wherein the processor device is further to:
identify one or more functions of the plurality of functions in the first software library that are modified in a third software library that comprises an updated version of the first software library; and
determine, based on the one or more functions and the call graph, whether the application requires the third software library.

17. A non-transitory computer-readable medium having stored thereon computer-executable instructions which, when executed by a processor device, cause the processor device to:
generate a first library graph that represents a first software library that comprises a first plurality of functions, wherein the first library graph comprises a plurality of nodes that each corresponds to a function of the first plurality of functions;
identify a function of the first plurality of functions as an invoked function that is directly invoked by an application that depends on the first software library;
generate a call graph that comprises a plurality of dependency nodes of the plurality of nodes of the first library graph, wherein each dependency node of the plurality of dependency nodes corresponds to the invoked function or a function invoked by the invoked function during execution of the application; and
generate a second software library based on the call graph by copying a second plurality of functions of the first plurality of functions that corresponds to the plurality of dependency nodes from the first software library to the second software library.

18. The non-transitory computer-readable medium of claim 17, wherein the computer-executable instructions further cause the processor device to generate a software package that comprises the application and the second software library.

19. The non-transitory computer-readable medium of claim 17, wherein the computer-executable instructions further cause the processor device to store the call graph in association with the application and a release indicator for the first software library.

20. The non-transitory computer-readable medium of claim 19, wherein the computer-executable instructions further cause the processor device to:
identify one or more functions of the plurality of functions in the first software library that are modified in a third software library that comprises an updated version of the first software library; and
determine, based on the one or more functions and the call graph, whether the application requires the third software library.

* * * * *